Jan. 28, 1969 F. P. HYLAND 3,424,451

APPARATUS FOR FEEDING BLANKS

Filed March 6, 1967 Sheet 1 of 3

INVENTOR
FRANCIS P. HYLAND
BY
Andrus & Starke
Attorneys

INVENTOR
FRANCIS P. HYLAND
BY Andrus & Starke
Attorneys

INVENTOR
FRANCIS P HYLAND
BY
Andrus & Starke
Attorneys

United States Patent Office
3,424,451
Patented Jan. 28, 1969

3,424,451
APPARATUS FOR FEEDING BLANKS

Francis P. Hyland, Wauwatosa, Wis., assignor to Hy-Grip Products Co., Wauwatosa, Wis., a partnership Filed Mar. 6, 1967, Ser. No. 621,000
U.S. Cl. 271—11 5 Claims
Int. Cl. B65h 5/08

ABSTRACT OF THE DISCLOSURE

This invention relates to a mechanism for feeding individual cards or blanks to the reader of an automatic typewriter. The mechanism includes a storage bin where the cards are stored in a vertical stack, and a vacuum lifting unit elevates the uppermost card in the stack, and thereafter moves the card forwardly to insert the card between cooperating rollers of a conveying unit which delivers the card to the reader.

Automatic typewriters are designed to automate the preparation of repetitive business documents such as sales orders, invoices, letters and the like. In a common automatic typing system, a tape reader is associated with the typewriter and as the tape containing programmed repetitive data is fed into the reader, the typewriter is automatically operated to produce the data on the typing sheet. In addition to the tape reader, a series of marginally punched edge cards containing programmed information are simultaneously fed into a card reader associated with the typewriter, and operation of the card reader is synchronized with the tape reader to sequentially produce the programmed information from both readers. For example, the cards may contain the name, address and salutation for individual letters and the tape may contain data for the body of the letter. The reading of the cards and tape is synchronized so that information or data from both the cards and the tape will be selectively read and reproduced on the letter.

The present invention is directed to a card feeding mechanism designed to remove an individual card or blank from a stack and feed the card to the card reader associated with the automatic typewriter. More specifically, the card feeding mechanism includes a bin which contains a stack of the cards containing the programmed data. A vacuum lifting unit is moved between an upper and a lower position in programmed sequence and includes a vacuum cup which engages the uppermost card in the stack when the lifting unit is in the lower position and raises the card upwardly. The drive mechanism then moves the elevated card forwardly and inserts the edge of the card between cooperating feed rollers which serve to convey the card to the reader associated with the automatic typewriter.

The card-feeding mechanism of the invention, when associated with an automatic typewriting system, eliminates the manual feeding of the cards to the reader. Under normal conditions, a stack of cards sufficient for up to four hours of typing can be stacked in the bin, so that the typewriter can be left unattended for the four-hour period.

Moreover, the card-feeding unit of the invention provides a contained inventory of cards in the bin so that the possibility of loss or mixing of cards is minimized.

The card feeder of the invention also provides a controlled and uniform feeding action which eliminates jamming of cards in the reading mechanism.

Other objects and advantages will appear in the course of the following description.

The drawings illustrate the best mode presently contemplated of carrying out the invention.

Figure 1:
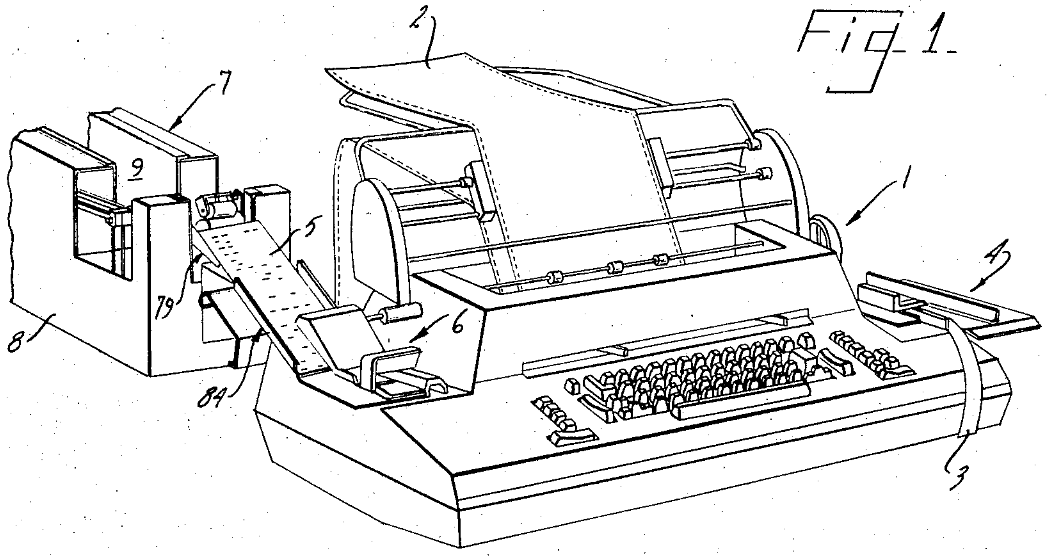
FIGURE 1 is a perspective view of an automatic typewriting system incorporating the card feeder of the invention.

The drawings illustrate an automatic typewriter 1 which is designed to automatically type data on a sheet of paper 2 which is automatically fed to the typewriter. Programmed data to be typed on the paper 2 is contained on a tape 3 which is fed to a tape reader 4 mounted on the typewriter. In addition to the programmed data contained on tape 3, additional pertinent data is contained on marginally punched edge cards 5 which are individually fed to a card reader 6 mounted on the opposite side of the typewriter.

The cards 5 are fed to the reader 6 by the card feeder 7 of the invention. The feeder 7 includes an outer housing or casing 8 and the central portion of the housing defines a bin 9 which contains a series of stacked cards 5. The bin has an open top and is defined by a pair of side walls 10, a rear wall 11, a bottom wall 12 and a front wall 13.

Figures 4, 5, 6:
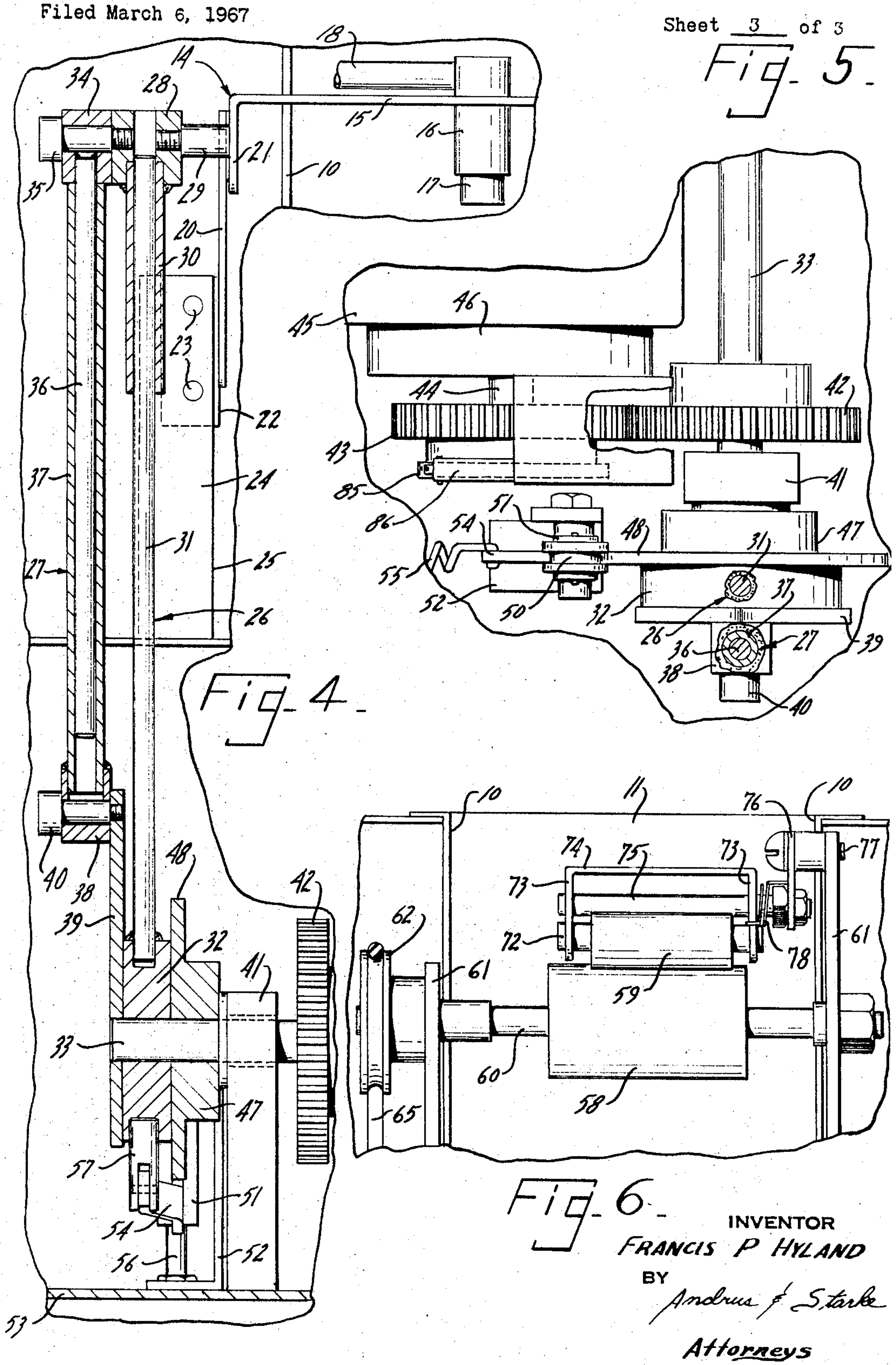
FIG. 4 is a section taken along line 4—4 of FIG. 2.
FIG. 5 is a section taken along line 5—5 of FIG. 2.
FIG. 6 is a section taken along 6—6 of FIG. 2.

The uppermost card 5 in the stack contained within bin 9 is adapted to be raised from the stack by a vacuum head 14 including a channel member 15 which extends transversely of the housing 8. As best shown in FIG. 4, a tubular adapter 16 is mounted within an opening in the central portion of channel 16 and a vacuum cup 17, formed of a resilient material such as rubber or plastic, is mounted on the lower end of the tubular adapter 16. The upper end of the adapter is connected by a conduit or tube 18 to a vacuum pump 19 which is located within the housing 8 beneath the bin 9. The pump 19 serves to draw a vacuum within the conduit 18, and when the vacuum cup 17 is moved downwardly into engagement with the uppermost card 5 in the stack, the card will adhere to the cup 17 due to the differential in pressure.

Figure 3:
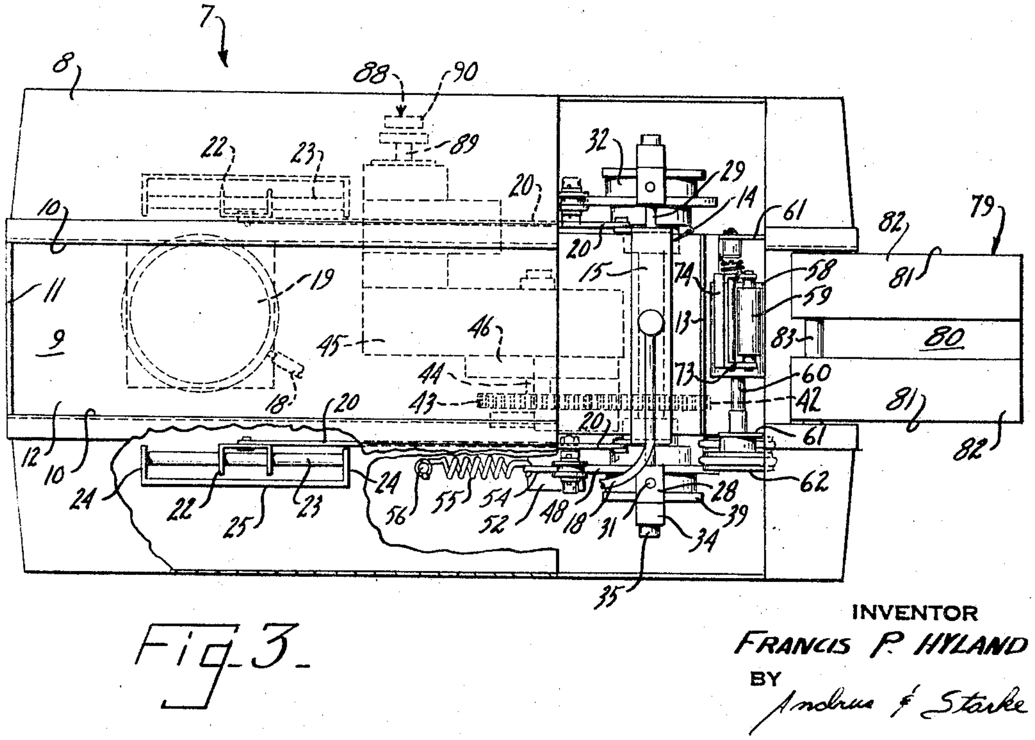
FIG. 3 is a top plan view of the card feeder with parts broken away in section.

The vacuum head 14 is adapted to be moved generally vertically between an upper and a lower position, and to guide the vacuum head 14 in movement, a pair of generally parallel arms 20 are pivotally connected to each flange 21 of the channel member 15. The opposite ends of each pair of arms 20 are pivotally connected to the central portion of a channel bracket 22, as shown in FIG. 3, and the flanges of channel bracket 22 are provided with aligned openings which slidably receive guide rods 23. The ends of guide rods 23 are secured to the flanges 24 of channel bracket 25 which is supported by housing 8. With this connection, the arms 20 are always maintained in parallel relation to thereby maintain the axis of vacuum cup 17 in a generally vertical relation as the vacuum head 14 is moved between its upper and lower positions.

The vacuum head 14 is carried by two pair of telescopic arm units 26 and 27 and one of each pair of the telescopic units 26 and 27 is attached to each end of the channel member 15. As best shown in FIG. 4, each telescopic arm unit 26 includes a hub 28 pivotally connected by stud 29 to the flange 21 of the channel member 15, and a tube 30 is secured within an opening in the hub 28 and is slidably mounted with respect to a rod 31 extending upwardly from ring 32. Ring 32 is journalled on horizontal shaft 33.

Each telescopic arm unit 27 includes a hub 34 which is connected to hub 28 by stud 35, and a rod 36 is secured within an opening in hub 34. Rod 36 is slidably mounted in a tube 37 secured to hub 38, while the hub 38 is pivotally connected to plate 39 by stud 40. The plate 39 is provided with a central opening and the respective end of shaft 33 is secured within the opening. Shaft 33 is journalled within bearings 41 mounted on the bottom of housing 8.

To rotate the shaft 33, a gear 42 is secured to the shaft and is driven by a gear 43 mounted on the shaft 44. Shaft 44 is driven by a motor 45 acting through a gear train located within gear box 46. As the shaft 33 rotates, the plate 39 rotates with the shaft, and as the plate 39 is connected to the vacuum head 14 through the telescopic arm unit 27 the head 14 will be raised and lowered in accordance with rotation of the plate 39. As the head 14 moves downwardly, the vacuum cup 17 will engage the uppermost card 5 in the stack located in bin 9 and the operation of the vacum pump 19 is synchronized with the movement of head 14 so that a vacuum will be drawn in the tube 18 and cup 17 before the cup engages the uppermost card 5 and the card will then adhere to the cup. Continued rotation of the plate 39 will move head 14 and the attached card upwardly. The telescopic nature of the arm units 27 enables the head 14 to engage and elevate the uppermost card 5 regardless of the height or depth of the stack. For example, if a relatively deep stack of cards is in the bin 9, the vacuum cup 17 will engage the uppermost card at a relatively high position and the telescopic connection of tube 37 and rod 36 permits the plate 39 to continue to rotate even through engagement of the head 14 with the uppermost card in the stack prevents further lowering of the head.

After the uppermost card 5 in the stack has been lifted from the stack by the vacuum head 14, a provision is made to move the card forwardly so that it can be delivered to a conveying mechanism and conveyed to the card reader 6. In this regard a cam 47 is secured to the shaft 33 and each cam 47 is provided with a peripheral cam surface 48. The mapor portion of cam surface 48 lies on a radius of shaft 33, and the cam surface 48 is also provided with a depression or valley 49. A cam follower 50 is mounted for rotation on the upper end of an arm 51 pivotally mounted on pedestal 52, and the follower 50 is adapted to ride on the cam surface 48, as the cam 47 rotates with shaft 33. The pedestal 52 is mounted on the bottom surface 53 of housing 8.

The lower end of the arm 51 is forked and a link 54 is pivotally connected to the forked end of the arm. One end of a coil spring 55 is secured to the rear end of link 54 while the opposite end of spring 55 is mounted on a spring support 56 which extends upwardly from the bottom surface 53. The forward end of the link 54 is pivotally connected to an extension 57 which extends downwardly from the ring 32. As previously described, the ring 32 is freely journalled on the shaft 33.

The spring 55 tends to pivot the arm 51 about its pivotal connection to the pedestal 52 and thereby urges the follower 50 into engagement with the cam surface 48 of cam 47. As the cam rotates, the valley 49 will approach the location of the follower 50 and the force of spring 55 will urge the follower 50 into the valley and will draw the link 54 rearwardly to pivot the ring 32 about the shaft 33. Pivotal movement of the ring 32 will cause the telescopic arm unit 26, which is attached to the ring 32, to pivot forwardly to thereby move the vacuum head 14 and the attached card 5 toward the conveying unit.

Figure 2:
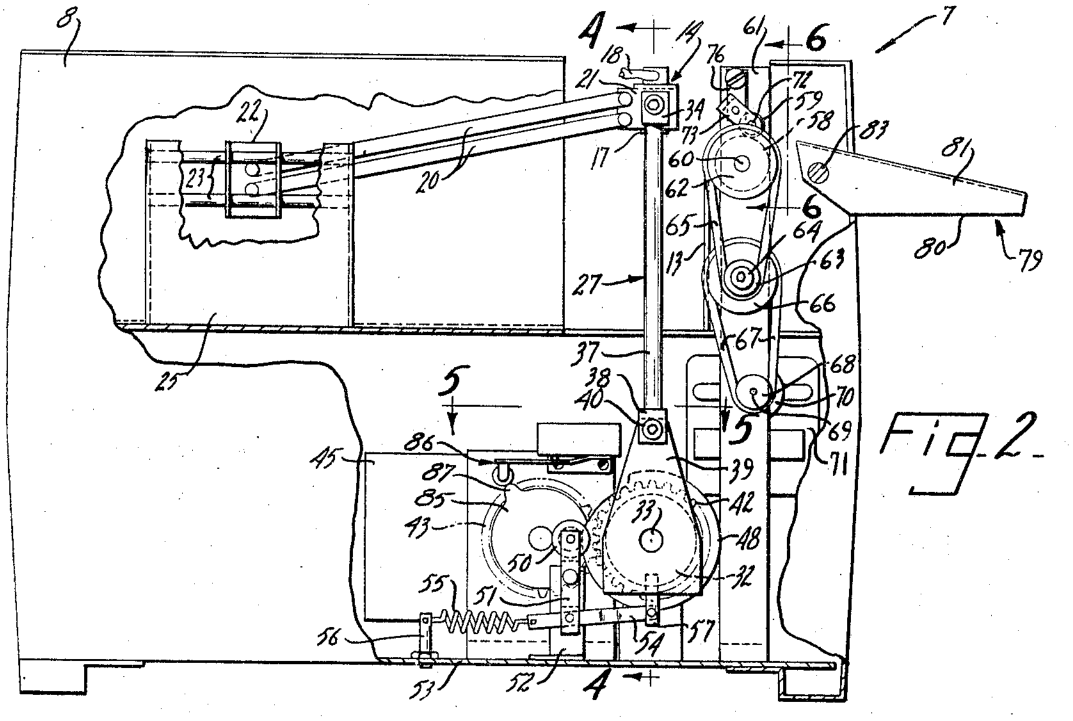
FIG. 2 is a side elevation with parts broken away of the card feeder of the invention.

As the cam 47 continues to rotate, the follower 50 will move out of the valley 49 causing the arm 51 to return to its original position and thereby move the link 54 forwardly to rotate the ring 32 and pivot the vacuum head 14 to its original position in general vertical alignment with shaft 33, as shown in FIG. 2.

Forward movement of the vacuum head 14 caused by pivotal movement of the telescopic arm unit 26 serves to insert the forward edge of the card 5 between a pair of cooperating feed rollers 58 and 59. Roller 58 is a drive roll and is mounted on a shaft 60 which is journalled between vertical supports 61. One end of the shaft 60 carries a pulley 62, and pulley 62 is interconnected with a pulley 63 mounted on shaft 64 by a belt 65. Shaft 64 also carries a second pulley 66 which is connected by belt 67 to a pulley 68 mounted on motor drive shaft 69. Drive shaft 69 is driven by a motor 70 which is mounted on support 61 by bracket 71. With this drive system, rotation of the motor drive shaft 69 is transmitted through the belt drives 67 and 65 to drive the drive roller 58.

As shown in FIG. 6, the idler roller 59 is mounted on a shaft 72 which is journalled between the flanges 73 of channel bracket 74. A second shaft 75 is mounted within openings in the flanges 73 of channel bracket 74 and the outer end of shaft 75 is pivotally connected to a link 76 which is pivotally attached through pin 77 to the upper end of one of the vertical supports 61. This linkage permits the channel member 74 and the idler roller 59 to pivot toward and away from the drive roller 58 about the axis of the shaft 75. A coil spring 78 is mounted around the shaft 75 and one end of the spring fits over the edge of the flange 73. Spring 78 acts to urge the channel bracket 74 and the idler roller 59 toward the drive roller 58.

The pivotal movement of the telescopic arm units 26 serve to insert the forward edge of the card 5 carried by the vacuum head 14 between the cooperating rolls 58 and 59 and the card is then moved forwardly and deposited in a chute 79 which is supported by housing 8. Chute 79 includes a bottom wall 80, a pair of side walls 81 which are pivoted to the housing 8 and a pair of top walls 82 which partially extend over the bottom wall 80. Side walls 81 are pivotally connected by pin 83 to the housing 8 so that the angularity of the chute 79 can be changed as desired to provide the optimum delivery of the cards from the chute 79 into a chute 84 on the reading unit.

The operation of the vacuum pump 19 as well as the motor 44 is synchronized with the reading of the card by the reading unit 6, so that when an individual card is discharged from the reader 6, the motor 45, as well as the vacuum pump 19 will be activated to start a cycle to elevate another card from the stack and insert the card within the feed rolls 58 and 59. The synchronization of the drive mechanisms is accomplished by means of a cam 85 which is mounted on the drive shaft 44. A limit switch 86 is supported from the gear box 46 and switch 86 rides on the peripheral surface of the cam 85. Cam 85 is provided with a projection or hump 87, and when the limit switch 86 rides onto the projection 87, the limit switch is actuated to open the electrical circuit and shut off both the motor 45 and the vacuum pump 19. A second limit switch, not shown, is associated with the reader 6 and when the card 5 is discharged from the reader 6, the limit switch is actuated to close the circuit to the motor 45 and pump 19 to thereby start the drive and the vacuum pump. The position of the hump 87 of cam 85 is arranged with respect to the overall cycle, so that the limit switch 86 will ride onto the hump 87 to open the circuit and release the vacuum after the card has been inserted between the feed rollers 58 and 59. The vacuum head 14 will remain in this upper position until the circuit is again closed by actuation of the limit switch by the card by being discharged from the reader 6.

To prevent free wheeling of the motor drive shaft and a loss of indexing, a brake unit 88 is associated with the shaft 89 of motor 45. The brake 88 is actuated by a solenoid 90, and the solenoid 90 is enerized when the limit switch 86 rides on the hump 87 so that the motor 45 will be stopped and the brake 88 will be engaged to prevent free wheeling of the motor and a loss of indexing.

Figures 7, 8:
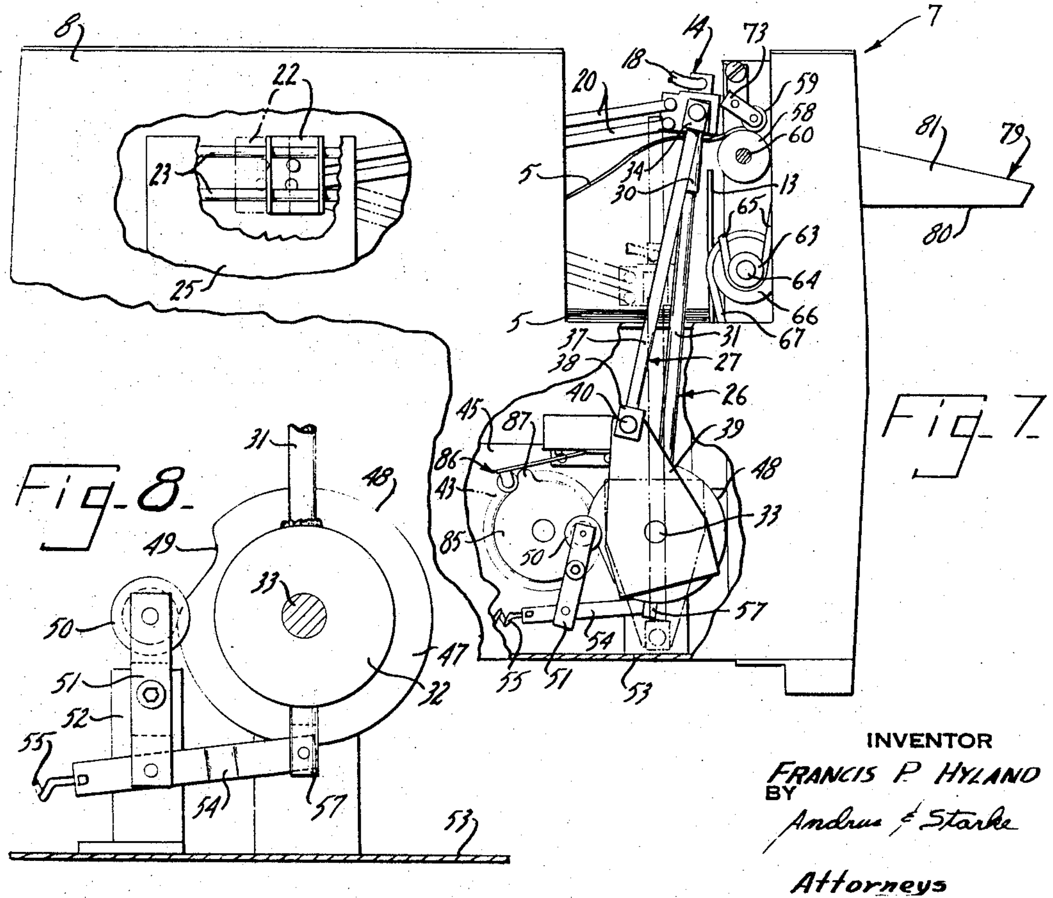
FIG. 7 is a side elevation of the mechanism, with parts broken away in section and showing the vacuum feeding the card to the feed rollers.
FIG. 8 is an enlarged vertical section showing the cam mechanism for moving the card in a horizontal path.

FIG. 7 is a view showing the vacuum head 14 in the elevated forward position in which the card 5 is being inserted between the feed rollers 58 and 59. From this position the head 14 moves rearwardly to the position shown in FIG. 2, and then downwardly to the phantom position shown in FIG. 7 where the vacuum cup 17 engages the uppermost card 5 in the stack. The head 14 then travels vertically upward, carrying the card 5, and then moves forwardly to the position shown in FIG. 7 to insert the card between the feed rollers 58 and 59.

As previously described, the hump 87 of cam 85 is positioned so that the vacuum will be released after the head 14 has moved forward to the position shown in FIG. 7 and the card is located between the feed rollers.

The card feeder of the invention enables a substantial number of cards containing programmed data to be automatically fed to the typewriter without manual supervision. As the cards are contained in a stack in the bin 9 and are successively fed to the reader and are collected after reading a second storage bin, there is a minimum loss or mixing of the cards.

As a further advantage, the feeding of the cards to the reader 6 is controlled, resulting in a more uniform operation and minimizing any tendency for jamming or skipping of the cards.

Various modes of carrying out the invention are contemplated as being within the scope of the following claims particularly pointing out and distinctly claiming the subject matter which is regarded as the invention.

I claim:

1. An apparatus for feeding programmed cards to a reading mechanism, comprising a bin to contain a stack of generally horizontal cards, card lifting means including a vacuum member to engage the uppermost card in the stack, vacuum means connected to the vacuum member to create a vacuum therein, conveying means located at a level above said stack, drive means operably connected to said card lifting means for moving said card lifting means in a direction between an upper and a lower position, said vacuum member being arranged to engage the uppermost card in the stack when the card lifting means is at its lower position and said vacuum member acting to raise said uppermost card when the card lifting means moves to its upper position and feed the card to the conveying means, card reading means, said conveyor means disposed to deliver the card to the card reading means, means responsive to the card being fed to said conveyor means for stopping said drive means, and means responsive to the discharge of the card from said card reading means for starting said drive means.

2. The apparatus of claim 1, wherein said drive means includes a motor, and brake means connected to said motor, said means responsive to the card being fed to the conveying means also acting to simultaneously engage said brake means.

3. The apparatus of claim 1, wherein said drive means acts to move said card lifting means in a first generally vertical direction to raise said vacuum member and then move the vacuum member in a second generally horizontal direction to feed the elevated card to the conveying means.

4. The apparatus of claim 1, and including means for providing relative movement between the vacuum member and the drive means when the vacuum member engages the uppermost card in the stack to thereby prevent further downward movement of the vacuum member in accordance with continued downward movement of the drive means.

5. The apparatus of claim 1, in which said drive means includes a first drive unit for moving said card lifting means in a generally vertical direction and includes a second drive unit for moving said card lifting means in a generally horizontal direction, said first drive unit including a rotatable crank and a longitudinally extensible member connecting said vacuum member and said crank whereby rotation of the crank moves said vacuum member between said upper and lower positions, said second drive unit including an elongated pivotal element connected to said vacuum member and disposed generally parallel to said extensible member, said elongated pivotal member being mounted for pivotable movement about a generally horizontal axis, said second drive unit also including means for pivoting said elongated member about said axis to move said vacuum member toward the conveying means and thereby deliver the elevated card to said conveying means.

References Cited

UNITED STATES PATENTS

| | | | |
|---|---|---|---|
| 1,625,085 | 4/1927 | Leach. | |
| 3,199,863 | 8/1965 | Muller | 271—26 |

RICHARD E. AEGERTER, *Primary Examiner.*